United States Patent
Young et al.

(10) Patent No.: US 12,003,646 B2
(45) Date of Patent: Jun. 4, 2024

(54) STORAGE LOCATIONS FOR ANTI-PHISH, PERSONALIZED, SECURITY TOKENS FOR USE WITH ELECTRONIC COMMUNICATIONS

(71) Applicant: Bank of America Corporation, Charlotte, NC (US)

(72) Inventors: Michael Young, Davidson, NC (US); Vinesh Patel, London (GB); Melissa Gordon Glenn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 17/722,773

(22) Filed: Apr. 18, 2022

(65) Prior Publication Data

US 2023/0336353 A1    Oct. 19, 2023

(51) Int. Cl.
*H04L 9/32* (2006.01)
*H04L 9/40* (2022.01)

(52) U.S. Cl.
CPC .......... *H04L 9/3236* (2013.01); *H04L 9/3213* (2013.01); *H04L 9/3231* (2013.01); *H04L 63/1483* (2013.01); *H04L 2209/56* (2013.01)

(58) Field of Classification Search
CPC ... H04L 9/3236; H04L 9/3231; H04L 9/3213; H04L 63/1483; H04L 2209/56
See application file for complete search history.

(56) References Cited

U.S. PATENT DOCUMENTS

| | | |
|---|---|---|
| 6,965,919 B1 | 11/2005 | Woods et al. |
| 7,290,035 B2 | 10/2007 | Mattathil |
| 7,802,298 B1 | 9/2010 | Hong et al. |
| 7,841,003 B1 | 11/2010 | Emdee |
| 8,291,065 B2 * | 10/2012 | Goodman ........... H04L 63/1483 709/224 |
| 8,949,978 B1 | 2/2015 | Lin et al. |

(Continued)

OTHER PUBLICATIONS

NPL Search Terms (Year: 2024).*

(Continued)

*Primary Examiner* — Syed A Zaidi
(74) *Attorney, Agent, or Firm* — Weiss & Arons LLP (57) ABSTRACT

Methods for securing an electronic communication is provided. Methods may, in a registration process, create and/or select an anti-phish, personalized, security token for a predetermined account on a computing device. Methods may generate a hash of the token, store the token and the hash in a secure storage location within the computing device. Methods may, in an in-use process, generate an electronic communication at a channel. The database may be interposed along the channel. Methods may forward the communication to a recipient associated with the account. Methods may intercept the communication at the database. Methods may select the hash from the database. Methods may generate an injected hash by injecting the hash into the communication. Methods may transmit the communication with the hash to the recipient. Methods may receive the electronic communication with the injected hash at the recipient. Methods may compare the injected hash to the stored hash. Methods may release and display the anti-phish token when the injected hash is equivalent to the stored hash.

20 Claims, 6 Drawing Sheets

(56) References Cited

U.S. PATENT DOCUMENTS

| | | | |
|---|---|---|---|
| 9,509,715 B2* | 11/2016 | Bach | G06F 21/6218 |
| 10,366,373 B1 | 7/2019 | Denker et al. | |
| 10,609,072 B1 | 3/2020 | Weldon | |
| 10,778,718 B2* | 9/2020 | Turuvekere Nataraja | G06F 21/33 |
| 10,931,709 B2 | 2/2021 | Parekh | |
| 11,055,394 B2 | 7/2021 | Norris, III | |
| 11,381,598 B2 | 7/2022 | Nunes et al. | |
| 11,438,377 B1* | 9/2022 | Azarafrooz | G06N 3/08 |
| 11,546,377 B2 | 1/2023 | Boshmaf et al. | |
| 11,785,004 B2 | 10/2023 | Soon-Shiong et al. | |
| 11,882,112 B2 | 1/2024 | Keiter et al. | |
| 2007/0074119 A1 | 3/2007 | Komine et al. | |
| 2008/0034428 A1 | 2/2008 | Bejar et al. | |
| 2008/0046968 A1 | 2/2008 | Cline et al. | |
| 2009/0292025 A1 | 11/2009 | Braude et al. | |
| 2009/0292925 A1 | 11/2009 | Meisel | |
| 2010/0031022 A1 | 2/2010 | Kramer | |
| 2013/0139238 A1 | 5/2013 | Ryan | |
| 2014/0020070 A1* | 1/2014 | Angal | H04L 63/10 726/5 |
| 2014/0137192 A1 | 5/2014 | Arroyo-Figueroa | |
| 2014/0181216 A1 | 6/2014 | Liebmann et al. | |
| 2016/0078214 A1* | 3/2016 | Angal | G06F 21/44 726/4 |
| 2016/0182418 A1 | 6/2016 | Gupta | |
| 2017/0230416 A1* | 8/2017 | Sabarish | H04L 63/0807 |
| 2017/0329944 A1* | 11/2017 | Satyavarapu | H04L 63/083 |
| 2020/0259772 A1 | 8/2020 | Dubie et al. | |
| 2020/0358798 A1 | 11/2020 | Maylor et al. | |
| 2021/0211462 A1 | 7/2021 | Birch et al. | |
| 2021/0218736 A1 | 7/2021 | Kumar et al. | |
| 2022/0070215 A1 | 3/2022 | Stolfo et al. | |
| 2022/0116420 A1 | 4/2022 | Weber et al. | |
| 2022/0318938 A1 | 10/2022 | Ogawa | |
| 2022/0385648 A1 | 12/2022 | Keiter et al. | |
| 2022/0385693 A1 | 12/2022 | Keiter et al. | |
| 2023/0086249 A1 | 3/2023 | Albero et al. | |
| 2023/0291765 A1 | 9/2023 | Young et al. | |
| 2023/0319029 A1 | 10/2023 | Young et al. | |

OTHER PUBLICATIONS

"USAA Suspicious Emails," https://www.usaa.com/inet/we/security_strange_email#:~:text=Cybercriminals%20may%20try%20and%20trick.to%20every%20email%20we%20send, USAA, Retrieved on Jan. 24, 2022.

"What Is An Email Header?—Guide," https://sendpulse.com/support/glossary/email-header, SendPulse, Retrieved on Mar. 21, 2022.

"What Is An Email Header?" https://whatismyipaddress.com/email-header, CGP Holdings, Inc., Retrieved on Mar. 21, 2022.

* cited by examiner

STORAGE LOCATIONS FOR ANTI-PHISH, PERSONALIZED, SECURITY TOKENS FOR USE WITH ELECTRONIC COMMUNICATIONS

FIELD OF TECHNOLOGY

Aspects of the disclosure relate to electronic communication security.

BACKGROUND OF THE DISCLOSURE

In recent years, the importance and the quantity of electronic communications has overtaken non-electronic communications. Electronic communications involve an assortment of information exchange. Such information exchange includes both sensitive information, such as bank account data, and non-sensitive information, such as daily international news.

Because of the profitability associated with malicious capture of sensitive information, those of malicious intent have created various techniques for deceptively obtaining sensitive information. One of the deceptive techniques may include phishing.

Phishing software is a category of malware in which an imitation electronic communication is sent to a recipient. A malicious entity may impersonate a legitimate entity, organization or individual. The malicious entity may generate an electronic communication. The electronic communication may appear to have been transmitted by the impersonated entity, organization or individual. The electronic communication may include an information request, a funds request, a download request or any other malicious actionable.

Many times, phishing communications are transmitted as mass campaigns. For example, a malicious entity may harvest a plurality of emails addresses from a plurality of sources, including websites. The malicious entity may transmit a mass, non-targeted, email campaign that impersonates a financial institution. The email may include a request to click on a link to recertify a know your customer ("KYC") criteria. Once selected, the link may direct a user to a malicious webpage that replicates the look and feel of a financial institution. The malicious webpage may capture sensitive information relating to the unsuspecting user.

Because of the proliferation of malicious phishing communications, many users are hesitant to enter information into and/or select links that are found within even legitimate electronic communications. Therefore, many legitimate electronic communications do not receive responses because the receivers are suspicious that the legitimate communications are phishing communications.

Therefore, it would be desirable for electronic communications originating from legitimate entities to be self-authenticating. As such, an anti-phish, personalized, security token may be injected into each electronic communication originating from a legitimate entity. The anti-phish, personalized, security token may increase the confidence of the receiving entity regarding the validity of the electronic communication.

It would be further desirable for the anti-phish, personalized, security token to be stored locally within a user's device. Locally storing the anti-phish, personalized, security token may heighten the security of the anti-phish, personalized, security token.

SUMMARY OF THE DISCLOSURE

Apparatus and methods for securing electronic communications is provided. Methods may include a registration process, in which a user registers for an anti-phish token. Methods may include an in-use process, in which an enterprise generates electronic communications, injects the electronic communications with an anti-phish token for each recipient and transmits the electronic communications to one or more recipients.

During the registration process, methods may include receiving a request from one or more user computing devices. The one or more user computing devices may be included in a plurality of user computing devices. The request may be to receive an anti-phish, personalized, security token with each electronic communication received in one or more of a plurality of channels. The plurality of channels may include email communications, short messaging service ("SMS") communications and instant messaging service ("IMS") communications.

During the registration process, methods may include displaying, to each user computing device included in the plurality of user computing devices, a plurality of selectable options for the anti-phish, personalized, security token. The plurality of selectable options may include a numeric code, a photograph, a plurality of photographs, an animation, a plurality of animations and/or any suitable combination of the above-stated options. The plurality of selectable options may be associated with a theme. The plurality of selectable options may enable a user to upload one or more photographs and/or one or more animations.

The plurality of selectable options may include a dynamically-rotating digital artwork file linked to a non-fungible token ("NFT"). The dynamically-rotating file may rotate on a predetermined schedule and/or randomly.

In some embodiments, a user may select a different option for each channel. As such SMSs may be received with a first anti-phish token, IMSs may be received with a second anti-phish token and emails may be received with yet a third token.

The presentation of the selectable options may be executed on a mobile device displaying a webpage. The webpage may be associated with the enterprise.

During the registration process, methods may include receiving from each user computing device, included in the plurality of user computing devices, a selection of an option, included in the plurality of selectable options.

During the registration process, methods may include registering the selected option for each of the user computing devices included in the plurality of user computing devices. The registering may include generating a hash of the selected, anti-phish, personalized, security token. The registering may include linking the hash to an identifier of the user device. The registering may include transmitting the hash linked to the identifier to a database. The database may be coupled to an interceptor computer system. The database coupled to the interceptor computer system may be interposed along the one or more channels. The registering may include storing the hash linked to the identifier in the database. The registering may include storing the anti-phish, personalized, security token in a secure storage location within the user computing device.

The database coupled to an interceptor computer system may be included in a plurality of databases. The plurality of databases may be coupled to the interceptor computer system. The registering may include storing the anti-phish, personalized, security token in a database included in the plurality of databases. The database may be related to the channel that is associated with the anti-phish, personalized, security token.

There may be an in-use process. The in-use process may involve an enterprise communicating with a user. During the in-use process, methods may include generating one or more electronic communications at one or more of the plurality of channels.

During the in-use process, methods may include generating one or more electronic communications at one or more of the plurality of channels.

During the in-use process, methods may include forwarding the one or more electronic communications to the one or more user devices. The forwarding may be via the one or more channels.

During the in-use process, methods may include intercepting the one or more electronic communications at the database coupled to the interceptor computer system.

During the in-use process, methods may include, for each of the one or more electronic communications, selecting from the database coupled to the interceptor computer system, the hash linked to the user identifier of the user device.

During the in-use process, methods may include for each of the one or more electronic communications, injecting the hash into the electronic communication in order to create an injected hash. During the in-use process, methods may include for each of the one or more electronic communications, transmitting the electronic communication with the injected hash, to the user device included in the one or more user devices.

During the in-use process, methods may include, for each of the one or more electronic communications, receiving the electronic communication, with the injected hash, at the user device included in the one or more user devices. During the in-use process, methods may include, for each of the one or mor electronic communications, generating a second hash of the anti-phish, personalized security token included in the secure storage.

During the in-use process, methods may include, for each of the one or more electronic communications, comparing the injected hash included in the electronic communication to the second hash. During the in-use process, for each of the one or more electronic communications, determining that the injected hash is equivalent to the second hash.

During the in-use process, methods may include, for each of the one or more electronic communications, releasing the anti-phish, personalized, security token from the secure storage location. During the in-use process, methods may include, for each of the one or more electronic communications, replacing the hash with the anti-phish, personalized security token. During the in-use process, methods may include, for each of the one or more electronic communications, displaying the electronic communication on the user device in the one or more user devices.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus, methods and systems for securing electronic communications is provided. The system may include an originating server, an edge server and a database. The originating server, edge server and database may be located at an entity.

During a registration process, the originating server may receive a request from a user device. The request may be to receive an anti-phish, personalized, security token with each electronic communication from the entity.

During the registration process, the originating server may display a plurality of selectable options for the anti-phish, personalized, security token. The originating server may receive a selection of an option for the anti-phish personalized, security token. The option may be included in the plurality of selectable options. The originating server may instruct the user device to store the selected option for the anti-phish, personalized, security token in a secure storage location on the user device. The originating server may instruct the user device to generate a hash of the selected option for the anti-phish, personalized, security token. The originating server may instruct the user device to transmit the hash from the user device to the originating server.

Additionally, the originating server may enable the user to direct the originating server to create anti-phish, personalized, security token for the user. Creation of such a token may involve a machine learning module at the originating server.

During the registration process, the originating server may register the hash as being linked to a profile associated with the user device.

During the registration process, the originating server may store, in the database, the hash linked to the profile associated with the user device.

During an in-use process, the originating server may generate an electronic communication. At least one recipient of the electronic communication may be the user device.

During the in-use process, the originating server may forward the electronic communication to the user device.

During the in-use process, the edge server may intercept the electronic communication. The edge server may retrieve the hash linked to the profile associated with the user device. The edge server may populate the electronic communication with the hash. The edge server may forward the electronic communication to one or more electronic channels associated with the user device.

During the in-use process, the user device may receive the electronic communication. The user device generates the second hash of the anti-phish, personalized, security token stored in secure storage. The user device may compare the second hash to the hash. When the second hash is equivalent to the hash, the user device may relace the hash in electronic communication with the anti-phish, personalized, security token. The user device may display the electronic communication with the anti-phish, personalized, security token.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
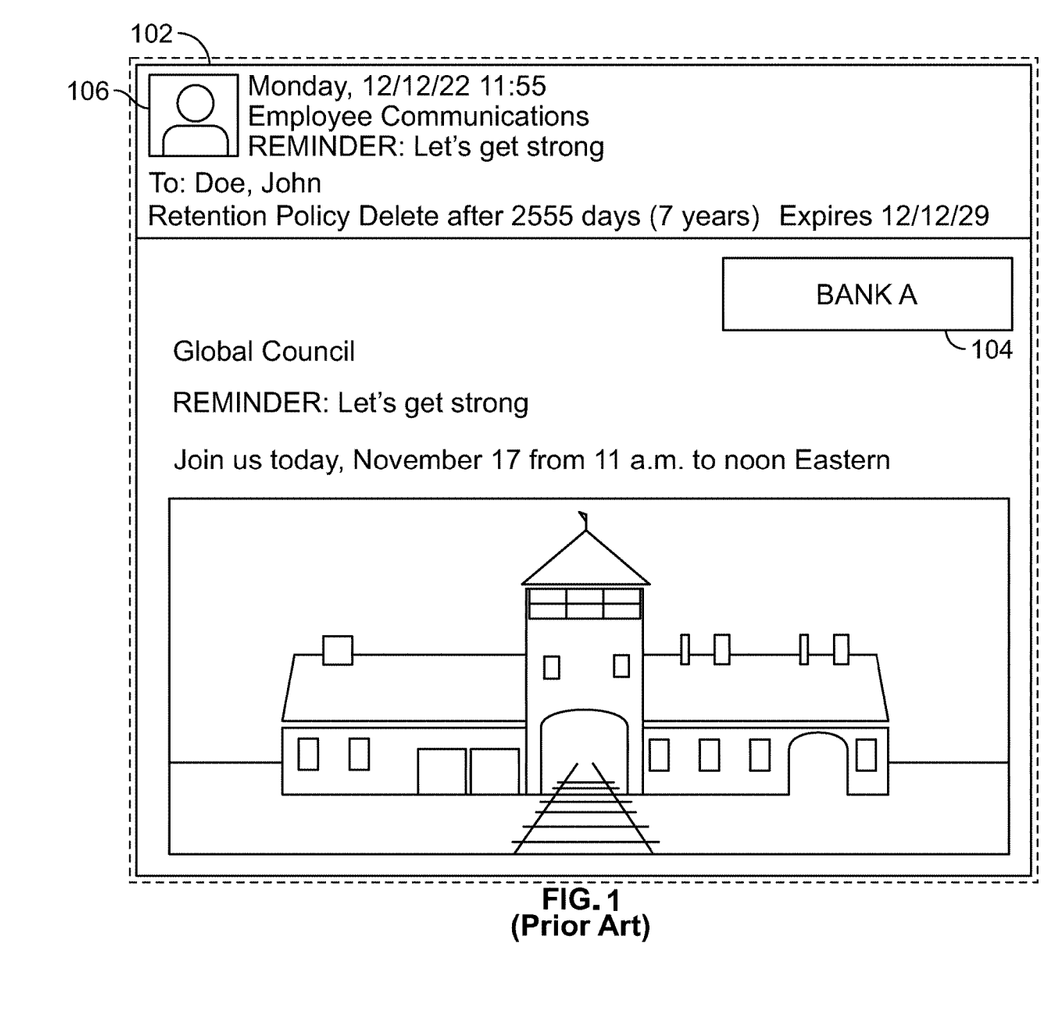
FIG. 1 shows an illustrative diagram in accordance with principles of the disclosure.

FIG. 1 shows a prior art diagram. The prior art diagram shows electronic communication 102. Electronic communication 102 may have been transmitted from Bank A to John Doe.

The details of electronic communication 102 may be shown at 106. The details may include the date (Monday, Dec. 22, 1922 11:55), the entity and/or address from which electronic communication 102 was transmitted (Employee Communications), the subject (Reminder: Let's get strong), the recipient list (John Doe), the retention policy (Delete after 2555 days (7 Years)) and the expiration date (Dec. 12, 2029).

The body of electronic communication 102 may include text, drawings and any other suitable details. The body of electronic communication 102 may also include logo 104. Logo 104 may indicate the entity that transmitted electronic communication 102. Logo 104 may indicate the affinity of electronic communication 102. Electronic communication 102 may have been transmitted from an employee communications address associated with Bank A.

It should be appreciated that John Doe may receive electronic communication 102. John Doe may identify the sender of the email as Employee Communications at Bank A. John Doe may work for Bank A. However, because of the proliferation of phishing communications, John Doe may not want to click links, open attachments or provide information within electronic communication 102.

Figure 2:
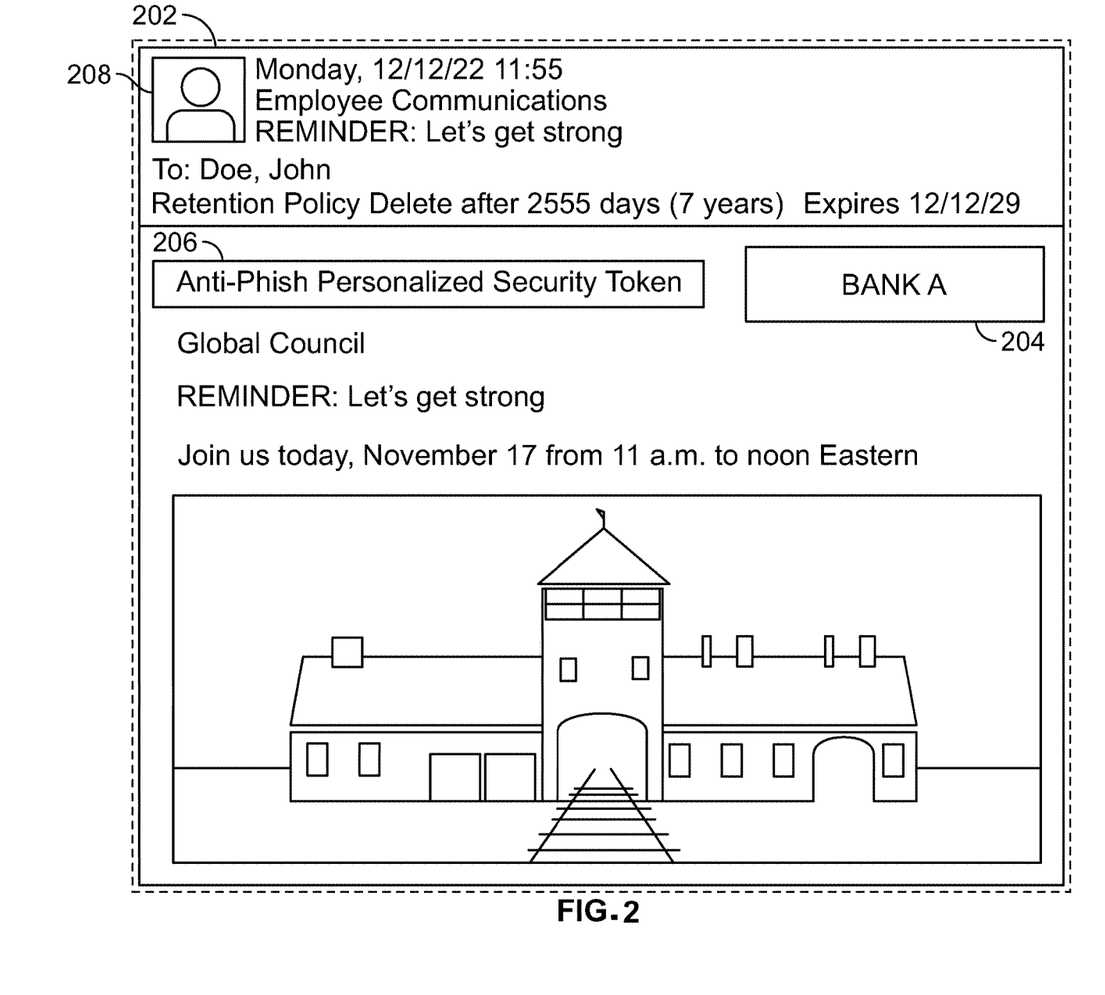
FIG. 2 shows another illustrative diagram in accordance with principles of the disclosure.

FIG. 2 shows an illustrative diagram. The illustrative diagram shows electronic communication 202. Electronic communication 202 may be an email. The details of electronic communication 202 may be shown at 208. The details may include the date (Monday, Dec. 12, 1922 11:55), the entity and/or address from which electronic communication 202 was transmitted (Employee Communications), the subject (Reminder: Let's get strong), the recipient list (John Doe), the retention policy (Delete after 2555 days (7 Years)) and the expiration date (Dec. 12, 2029).

The body of the electronic communication 202 may include text, drawings and any other suitable details. The body of electronic communication 202 may also include logo 204. Logo 204 may indicate the entity that transmitted electronic communication 202. Logo 204 may indicate the affinity of electronic communication 202. Electronic communication 202 may be transmitted from an employee communications address associated with Bank A.

Similar to electronic communication 102, shown in FIG. 1, John Doe may receive electronic communication 202. John Doe may identify the sender of the email as Employee Communications at Bank A. In order to achieve a level of confidence that the communication is indeed from Employee Communications at Bank A, John Doe may look for an anti-phish, personalized, security token embedded in electronic communication 202.

Anti-phish, personalized, security token may be shown at 206. Anti-phish, personalized, security token may be a dynamic and/or static, encrypted and/or non-encrypted, personalized electronic component that acts as a quick visual aid and indicates a level of confidence that the communication is indeed from an enterprise. The electronic component may be selected by the recipient of the communication, such as John Doe.

The electronic component may include one or more of the following, a numeric code, a photograph, an animation, a plurality of photographs, a plurality of animations any other suitable data element. The electronic component may dynamically select a photograph that relates to a pre-selected theme. As such, a communication recipient may select a theme, such as famous skyscrapers, and the token may retrieve a photograph or animation of a famous skyscraper from a plurality of photographs or from a network search, such as an Internet search. As such, the anti-phish, personalized, security token may appear different each time an electronic communication is transmitted from the transmitting entity to the recipient. For example, the anti-phish, personalized, security token may include a different photograph each time an electronic communication is transmitted from the transmitting entity to the recipient.

Even though a single electronic communication may be transmitted to multiple recipients, such as in a mass email campaign, the anti-phish, personalized, security token may be individual for each recipient. As such, after the electronic communication has been generated and transmitted, an intercepting server may inject the personalized token into each individual electronic communication.

Figure 3:
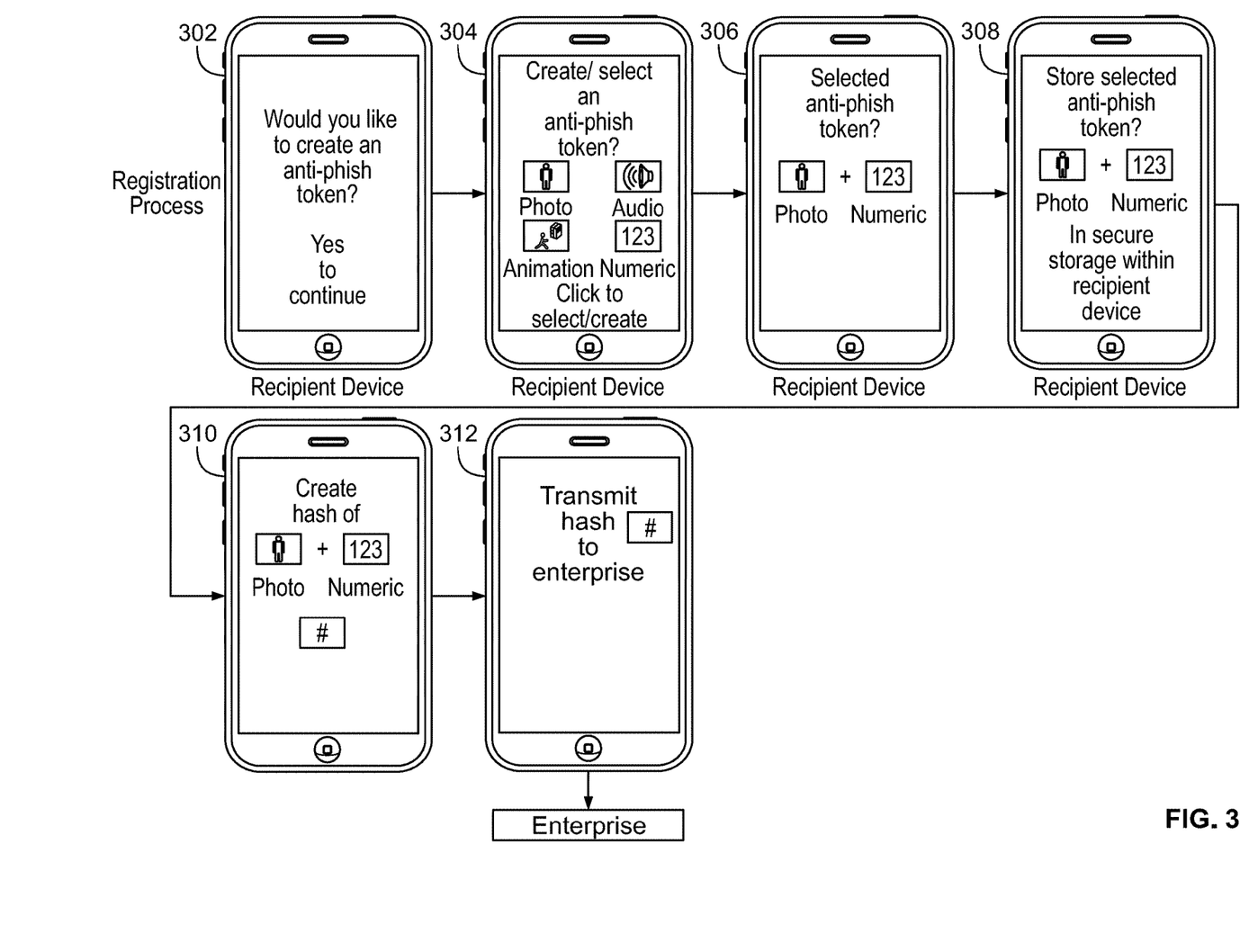
FIG. 3 shows an illustrative flow chart in accordance with principles of the disclosure.

FIG. 3 shows an illustrative diagram. The illustrative diagram shows a registration process for an anti-phish token. The registration process for an anti-phish token may be initiated on a web interface of a mobile device. The web interface of the mobile device may be powered by a hardware processor and/or memory device at an enterprise.

The registration process may include step 302. Steps 302 may query a user if the user would like to create an anti-phish token. If the user would like to create an anti-phish token, the user may select yes to continue.

Step 304 shows a various option for the user to create and/or select an anti-phish token. The various options may include a photograph file, an audio file, an animation file and/or a numeric file.

Step 306 shows the select anti-phish token. The selected anti-phish token may include a photograph file and a numeric file. The photograph file and/or the numeric file may have been created, selected, uploaded and/or instructed to be created by a machine-learning processor.

Once the anti-phish token has been selected, the anti-phish token may be stored. Step 308 shows the selected anti-phish token may be stored in secure storage within the recipient device.

Step 310 shows a hash algorithm may be executed on the anti-phish token. The hash algorithm may be executed at the recipient device. The hash algorithm may output a hash of the anti-phish token. Step 312 shows the hash is communicated to an enterprise.

It should be noted that storing the anti-phish token within the secure storage at the recipient device and generating a hash of the anti-phish token at the recipient device may enable the communication between the enterprise and the recipient device to be limited to hashes of the information included in anti-phish token. Therefore, it may be difficult, if not impossible, for a person of malicious intent to harvest a plurality of anti-phish tokens at a single location.

Figure 4:
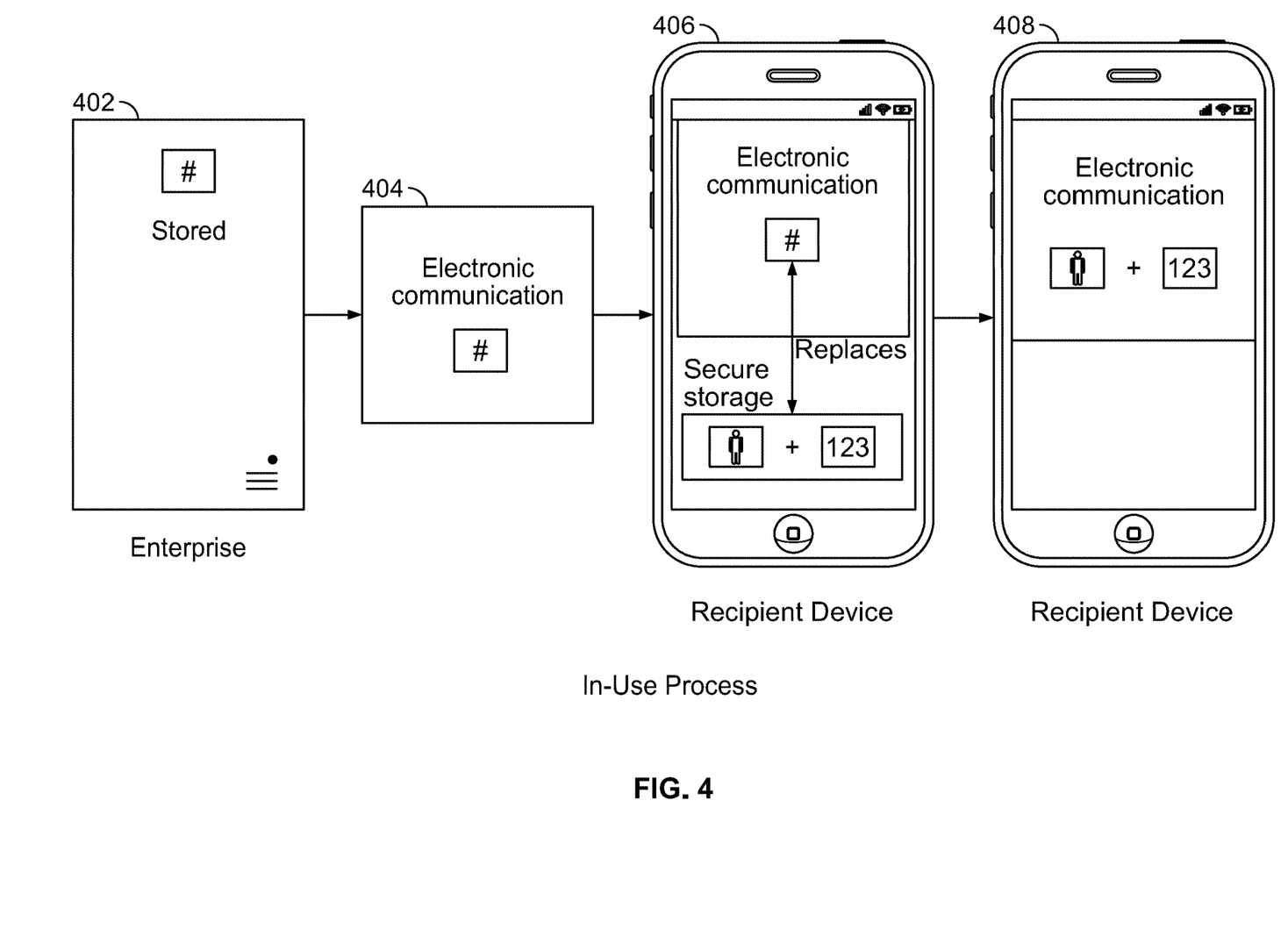
FIG. 4 shows another illustrative flow chart in accordance with principles of the disclosure.

FIG. 4 shows an illustrative diagram. The illustrative diagram shows an in-use process for an enterprise transmitting an electronic communication with a hash of an anti-phish token to a recipient device.

Step 402 shows an enterprise stores a hash of an anti-phish token. It should be noted that the hash may be linked to a user identifier associated with the recipient device. The user identifier may be an electronic address, such as an email address or mobile telephone number. Although a single hash is shown at 402, multiple hashes may be stored at enterprise 402.

Step 404 shows electronic communication 404. The enterprise may have generated an electronic communication. The recipient of the electronic communication may be a recipient device. The recipient device may have subscribed to an anti-phish token security protocol. Therefore, the electronic communication, being transmitted from the enterprise may include a hash of an anti-phish token. The hash may have been registered at the enterprise during a registration process.

Step 406 shows that the electronic communication was received at the recipient device. The electronic communication may include the hash of the anti-phish token. At the recipient device, the anti-phish token, stored in secure storage, may be re-hashed. The re-hash of the anti-phish token may be compared to the hash of the anti-phish token found within the electronic communication. If the re-hash of the anti-phish token is found to be equivalent to the hash of the anti-phish token, the anti-phish token may be released from the secure storage location.

The released anti-phish token may be replaced with the hash in the electronic communication. Step 408 shows the electronic communication with the anti-phish token displayed on the recipient device.

Figure 5:
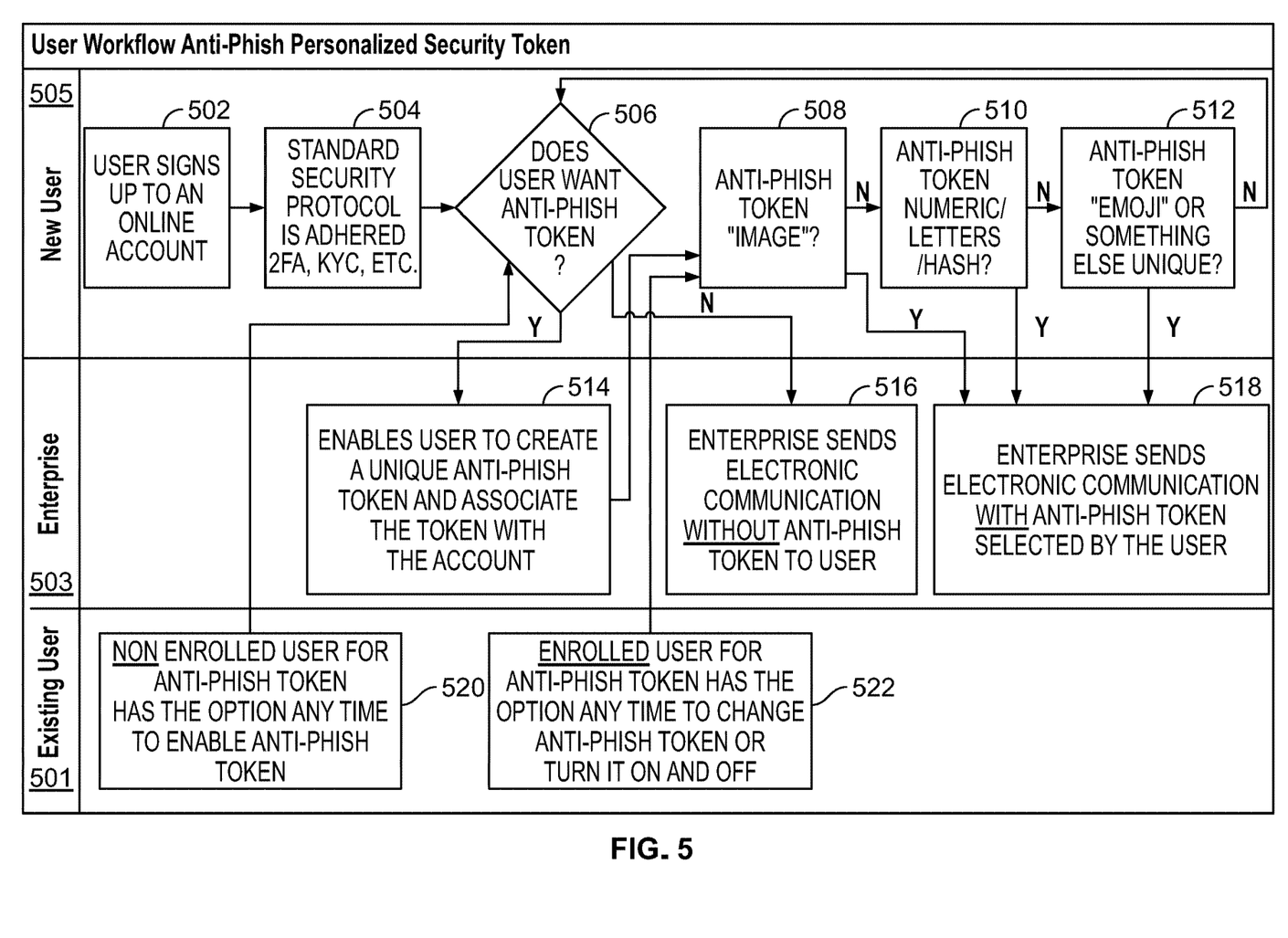
FIG. 5 shows yet another illustrative flow chart in accordance with principles of the disclosure.

FIG. 5 shows an illustrative flow chart. The flow chart relates to a user workflow for an anti-phish, personalized, security token. There may be three swim lanes (or any other suitable number of swim lanes), a new user swim lane 505, an enterprise swim lane 503 and an existing user swim lane 501.

A new user may sign up for an online account, as shown at 502. The online account may be opened using a computing apparatus, such as mobile device or personal computer ("PC"). The computing apparatus may communicate with an enterprise server. The communication between the new user and the enterprise server may include the new user opening, and communicating with, an enterprise website. The online account may be any suitable account associated with an enterprise. Such an enterprise may be indicated by swim lane 503.

Standard security protocols may be adhered to when opening the account, as shown at 504. Such security protocols may include two-factor authentication ("2FA") and know your customer ("KYC") protocols.

The enterprise server may query the user whether the user wants an anti-phish token, as shown at 506. It should be noted that an existing user, that is not enrolled for an anti-phish token, may have the option to enable an anti-phish token at any time, as shown at 520.

In the event that a user does want an anti-phish token, enterprise 503 may enable the user to create a unique anti-phish token and associate the unique anti-phish token with the account, as shown at 514. The user may select an anti-phish token image, as shown at 508, an anti-phish token numeric, letters and/or hash, as shown at 510, and an anti-phish token emoji or any other unique item, as shown at 512. Enterprise 503 may also enable a user to invoke an anti-phish generation algorithm. Such an anti-phish generation algorithm may generate a numeric code and/or photograph that may be specific to the user. The numeric code and/or photograph may be based on historical internet searches and/or other suitable information.

Once the anti-phish token is selected, the enterprise may send electronic communications to the user with the anti-phish token selected by the user, as shown at 518.

In the event that the user does not want an anti-phish token associated with the account, the enterprise may send electronic communications to the user without the anti-phish token, as shown at 516. Additionally, a user that is enrolled in the anti-phish token security protocol may have the option to change the anti-phish token or turn it on or off at any time, as shown at 522.

Figure 6:
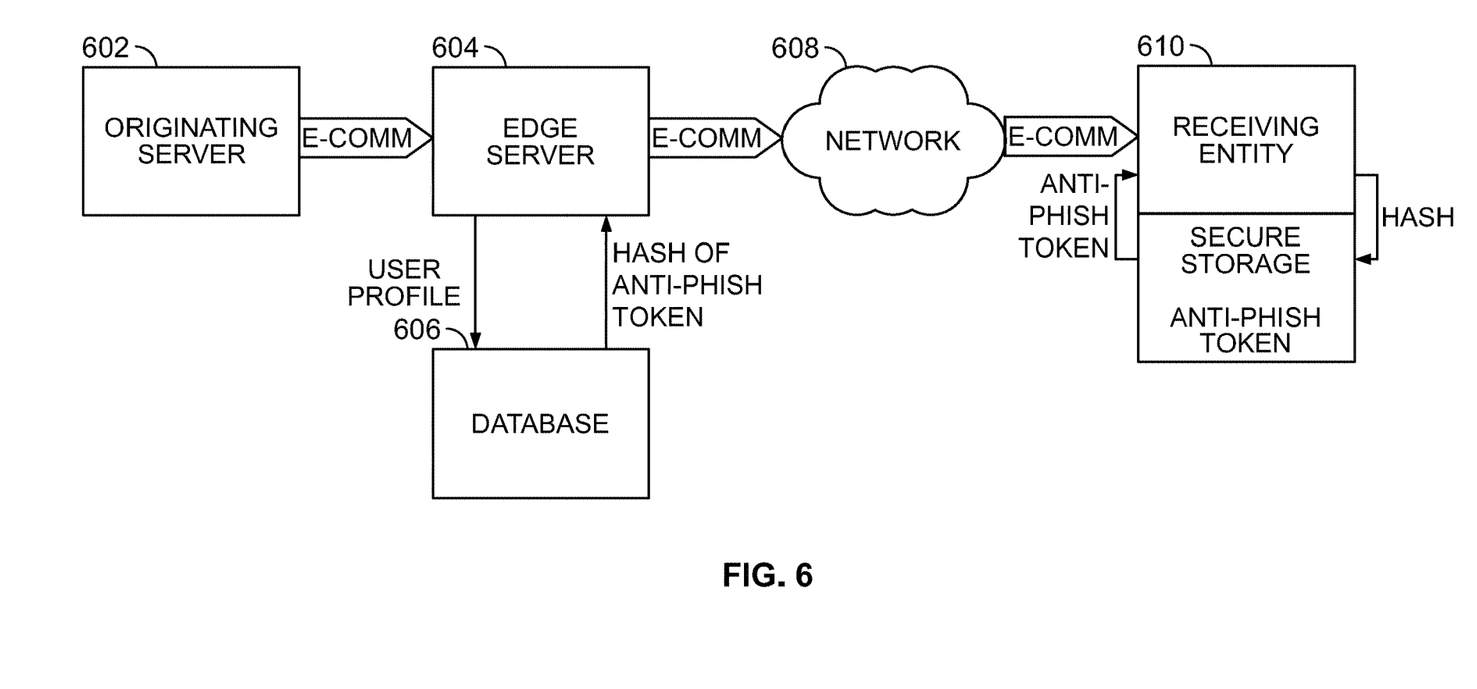
FIG. 6 shows an illustrative diagram in accordance with principles of the disclosure.

FIG. 6 shows an illustrative diagram. The illustrative diagram shows an implementation of a network environment that includes an anti-phish token.

The implementation shows that originating server 602 may generate an electronic communication, which may be shown in FIG. 6 as an e-comm. The electronic communication may be forwarded to edge server 604. The electronic communication may identify one or more recipients, also referred to as receiving entities.

For each identified recipient, edge server 604 may communicate a user profile to database 606. Database 606 may retrieve each hash of the anti-phish token associated with each receiving entity. Edge server 604 may inject each electronic communication with each retrieved hash of the anti-phish token.

Edge server 604 may transmit the electronic communications over network 608 to one or more receiving entities, such as receiving entity 610. Receiving entity 610 may receive the electronic communication.

Receiving entity 610 may include a secure storage location. The secure storage location may include the anti-phish, personalized, security token. Upon receiving the electronic communication with the injected hash, receiving entity may communicated the hash the secure storage location. The secure storage location may verify that the hash was previously generated from the anti-phish, personalized, security token. Upon verification, the secure storage location may release the anti-phish, personalized, security token. Upon release of the anti-phish, personalized, security token, the receiving entity may replace the hash with the anti-phish, personalized, security token. The electronic communication may be displayed with the anti-phish, personalized, security token.

Thus, an anti-phish, personalized, security token for use with electronic communications is provided. Persons skilled in the art will appreciate that the present invention can be practiced by other than the described embodiments, which are presented for purposes of illustration rather than of limitation. The present invention is limited only by the claims that follow.

What is claimed is:

1. A method for securing an electronic communication, the method comprising:

in a registration process:
creating and/or selecting an anti-phish, personalized, security token for a predetermined account on a computing device;
generating a hash of the anti-phish, personalized, security token at the predetermined computing device;
storing the anti-phish, personalized, security token and the hash in a secure storage location within the computing device;
transmitting the hash to a database associated with an enterprise;
linking the hash to the predetermined account at the database; and
storing the hash, linked to the predetermined account, within the database; in an in-use process:
generating an electronic communication at a channel associated with the enterprise, said database being interposed along the channel;
forwarding, via the channel, the electronic communication to the computing device;
intercepting the electronic communication at the database;
selecting, from the database, the hash that is associated with the predetermined account,
injecting the selected hash into the electronic communication in order to create an injected hash,
transmitting the electronic communication, with the injected hash, to the computing device;
receiving the electronic communication, with the injected hash, at the predetermined computing device;
comparing the injected hash within the electronic communication to the hash stored in the secure storage location within the predetermined computing device;
determining that the injected hash within the electronic communication is equivalent to the hash stored in the secure storage location;
releasing the anti-phish, personalized, security token from the secure storage location into the electronic communication;
replacing the injected hash within the electronic communication with the anti-phish, personalized security token; and
displaying the electronic communication with the anti-phish, personalized, security token on the computing device.

2. The method of claim 1, wherein the anti-phish, personalized, security token comprises a numeric code.

3. The method of claim 1, wherein the anti-phish, personalized, security token comprises a plurality of photographs.

4. The method of claim 3, wherein the electronic communication displays to the recipient a selected photograph from among the plurality of photographs.

5. The method of claim 3, further comprising:
generating a plurality of electronic communications at the channel;
forwarding, via the channel, the plurality of electronic communications to the recipient;
intercepting the plurality of electronic communications at the database;
injecting a photograph, from the plurality of photographs, into each electronic communication included in the plurality of electronic communications, where each electronic communication, included in the plurality of electronic communications, displays to the recipient a different selected photograph from the plurality of photographs; and
transmitting each electronic communication, with the injected anti-phish, personalized, security token, to the recipient.

6. The method of claim 3, wherein when there are a plurality of electronic communications transmitted along the channel, each electronic communication included in the plurality of electronic communications, displays to the user a different selected photograph from the plurality of photographs.

7. The method of claim 1, wherein the anti-phish, personalized, security token comprises a category of photographs and/or animations.

8. The method of claim 1, wherein the channel is selected from a plurality of channels comprising email communication, short messaging service ("SMS") communication and instant messaging service ("IMS") communication.

9. A method for securing electronic communications, the method comprising:

in a registration process:
receiving a request from each user computing device, included in a plurality of user computing devices, to receive an anti-phish, personalized, security token with each electronic communication received in one or more of a plurality of channels;
displaying, to each user computing device included in the plurality of user computing devices, a plurality of selectable options for the anti-phish, personalized, security token;
receiving, from each user computing device included in the plurality of user computing devices, a selection of an option, included in the plurality of selectable options; and
registering the selected option for the each of the user computing devices included in the plurality of user computing devices, said registering comprising:
generating a hash of the selected, anti-phish, personalized security token;
linking the hash to an identifier of the user device;
transmitting the hash linked to the identifier to a database, said database coupled to an interceptor computer system, said database coupled to the interceptor computer system being interposed along the one or more channels;
storing the hash linked to the identifier in the database; and
storing the anti-phish, personalized, security token in a secure storage location within the user computing device;
in an in-use process:
generating one or more electronic communications at one or more of the plurality of channels;
forwarding, via the one or more channels, the one or more electronic communications to the one or more user devices;
intercepting the one or more electronic communications at the database coupled to the interceptor computer system;
for each of the one or more electronic communications, selecting from the database coupled to the interceptor computer system, the hash linked to the user identifier of the user device;

for each of the one or more electronic communications, injecting the hash into the electronic communication in order to create an injected hash;

for each of the one or more electronic communications, transmitting the electronic communication, with the injected hash, to the user device included in the one or more user devices;

for each of the one or more electronic communications, receiving the electronic communication, with the injected hash, at the user device included in the one or more user devices;

for each of the one or more electronic communications, generating a second hash of the anti-phish, personalized security token included in the secure storage;

for each of the one or more electronic communications, comparing the injected hash included in the electronic communication to the second hash;

for each of the one or more electronic communications, determining that the injected hash is equivalent to the second hash;

for each of the one or more electronic communications, releasing the anti-phish, personalized, security token from the secure storage location;

for each of the one or more electronic communications, replacing the injected hash with the anti-phish, personalized, security token; and for each of the one or more electronic communications, displaying the electronic communication on the user device included in the one or more user devices.

10. The method of claim 9, wherein the plurality of channels comprises email communication, short messaging service ("SMS") communication and instant messaging service ("IMS") communication.

11. The method of claim 9, wherein the plurality of selectable options comprises a numeric code, a photograph, a plurality of photographs, an animation, a plurality of animations and/or a combination of the numeric code, photograph, plurality of photographs, animation and plurality of animations.

12. The method of claim 11, wherein the plurality of selectable options is associated with a theme.

13. The method of claim 11, wherein the plurality of selectable options enables the one or more users to upload one or more photographs.

14. The method of claim 11, wherein:
the database, coupled to an interceptor computer system, is included in a plurality of databases coupled to the interceptor computer system; and
the registering comprises storing the hash in a database, included in the plurality of databases, coupled to the interceptor computer system, that is associated with a channel, included in the one or more channels, that is associated with the hash.

15. A system for securing electronic communications, the system comprising:
an originating server located at an entity;
an edge server located at the entity;
a database located at the entity;
wherein during a registration process:
the originating server receives a request from a user device, the request to receive an anti-phish, personalized, security token with each electronic communication from the entity;
the originating server displays a plurality of selectable options for the anti-phish, personalized, security token;
the originating server receives a selection of an option for the anti-phish, personalized, security token, the option included in the plurality of selectable options;
the originating server instructs the user device to:
store the selected option for the anti-phish, personalized, security toke in a secure storage location on the user device;
generate a hash of the selected option for the anti-phish, personalized, security token; and
transmit the hash from the user device to the originating server;
the originating server registers the hash as being linked to a profile associated with the user device; and
the originating server stores, in the database, the hash linked to the profile associated with the user device;
wherein during an in-use process:
the originating server generates an electronic communication, where a recipient of the electronic communication is the user device;
the originating server forwards the electronic communication to the user device;
the edge server intercepts the electronic communication;
the edge server retrieves the hash linked to the profile associated with the user device;
the edge server populates the electronic communication with the hash;
the edge server forwards the electronic communication to one or more electronic channels associated with the user device;
the user device receives the electronic communication;
the user device generates a second hash of the anti-phish, personalized, security token stored in secure storage;
the user device compares the second hash to the hash;
when the second hash is equivalent to the hash, the user device replaces the hash in the electronic communication with the anti-phish, personalized, security token;
the user device displays the electronic communication with the anti-phish, personalized, security token.

16. The system of claim 15, wherein the plurality of selectable options comprises a numeric code, a photograph, a plurality of photographs, an animation, a plurality of animations and/or a combination of the numeric code, photograph, plurality of photographs, animation and plurality of animations.

17. The system of claim 16, wherein the plurality of selectable options is associated with a theme.

18. The system of claim 16, wherein the plurality of selectable options comprises dynamically-rotating, digital-artwork file linked to a non-fungible token ("NFT"), said digital-artwork file that rotates on a predetermined schedule.

19. The system of claim 16, wherein the plurality of selectable options comprises dynamically-rotating digital artwork linked to a non-fungible token ("NFT") that rotates randomly.

20. The system of claim 16, wherein the plurality of selectable options enables the user to upload one or more photographs.

* * * * *